United States Patent
Spathelf

(10) Patent No.: US 10,636,076 B2
(45) Date of Patent: *Apr. 28, 2020

(54) SEARCH RESULT ENHANCEMENT COMPONENT FOR INTEREST QUEUES

(71) Applicant: Amazon Technologies, Inc., Seattle, WA (US)

(72) Inventor: Whitney Gale Spathelf, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 633 days.

This patent is subject to a terminal disclaimer.

(21) Appl. No.: 15/071,131

(22) Filed: Mar. 15, 2016

(65) Prior Publication Data

US 2017/0270208 A1 Sep. 21, 2017

(51) Int. Cl.
  *G06F 16/00* (2019.01)
  *G06Q 30/06* (2012.01)
  *G06F 16/338* (2019.01)

(52) U.S. Cl.
  CPC ....... *G06Q 30/0633* (2013.01); *G06F 16/338* (2019.01); *G06Q 30/0623* (2013.01)

(58) Field of Classification Search
  CPC .............. G06F 16/338; G06Q 30/0623; G06Q 30/0633
  See application file for complete search history.

(56) References Cited

U.S. PATENT DOCUMENTS

| | | | |
|---|---|---|---|
| 2006/0271524 A1* | 11/2006 | Tanne | G06F 17/30648 |
| 2007/0156647 A1 | 7/2007 | Shen et al. | |
| 2009/0228811 A1 | 9/2009 | Adams et al. | |
| 2011/0093328 A1* | 4/2011 | Woolcott | G06Q 30/02 |
| | | | 705/14.41 |
| 2012/0054187 A1* | 3/2012 | Priyadarshan | G06F 17/30867 |
| | | | 707/740 |
| 2015/0193537 A1* | 7/2015 | Cierniak | G06F 16/9535 |
| | | | 707/733 |
| 2015/0256903 A1* | 9/2015 | Walker | H04N 21/23614 |
| | | | 725/32 |

OTHER PUBLICATIONS

PCT/US2017/021208, "International Search Report and Written Opinion," dated May 8, 2017, 13 pages.
Schafer et al., "E-Commerce Recommendation Applications," *Journal of Data Mining and Knowledge Discovery*, vol. 5, No. 1/02, Norwell, MA, (Jan. 1, 2001), pp. 115-153.
U.S. Appl. No. 15/071,136, filed Mar. 15, 2016, "Search Result Enhancement Component for Item Documents.".
PCT/US2017/021208, "International Preliminary Report on Patentability", dated Sep. 27, 2018, 8 pages.

\* cited by examiner

*Primary Examiner* — Dinku W Gebresenbet
(74) *Attorney, Agent, or Firm* — Kilpatrick Townsend & Stockton LLP

(57) ABSTRACT

Techniques for providing a supplementary information component to search results are provided. A search engine computer provides search results in response to the search query. The computer then identifies some interest in an item from the search results, then may generate and provide the supplementary information component.

20 Claims, 12 Drawing Sheets

SEARCH RESULT ENHANCEMENT COMPONENT FOR INTEREST QUEUES

CROSS-REFERENCE TO RELATED APPLICATIONS

This application is related to and incorporates by reference for all purposes the full disclosure of U.S. patent application Ser. No. 15/071,136 filed Mar. 15, 2016, entitled "SEARCH RESULT ENHANCEMENT FOR ITEM DOCUMENTS".

BACKGROUND

Since the inception of computers, data storage and data retrieval have been important functions within systems. In their early stages, simple queries could be used to retrieve such data. As the computing industry has grown, more and more data has been stored on computing systems. Some data may be stored locally and retrieved by the local computer itself. In other examples, data may be stored on a server, and accessible to other devices on the network. Some search queries still rely on relatively simplistic computer functions. For example, a user types in a search query and a search engine finds a match of terms in a database. The computer then compiles content to return as search results, and returns that content to the user. However, the results may not always be relevant in light of the search query terms used. As the amount of data that is stored in accessible locations increases, advances in search query technology may aid dramatically in obtaining more relevant results.

BRIEF DESCRIPTION OF THE DRAWINGS

Various embodiments in accordance with the present disclosure will be described with reference to the drawings, in which.

DETAILED DESCRIPTION

Figure 1:
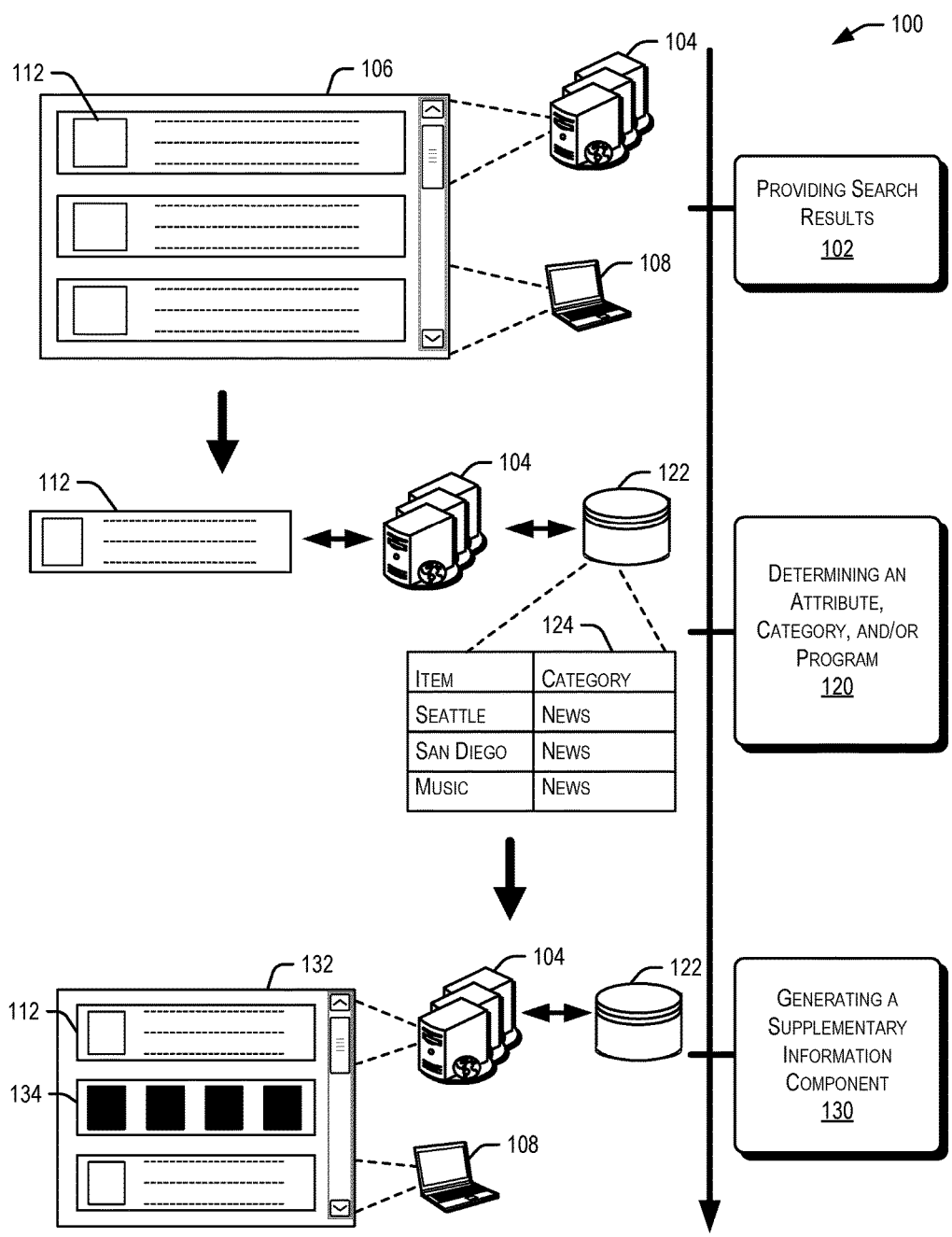
FIG. 1 is a flowchart that illustrates an example flow for providing a supplementary information component described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for providing a supplementary information component in a search result. For example, a search query term may be received and search results may be provided in response to the search query being executed. The system may then identify some interest in an item from the search results, which can include interacting with the item by selecting the item, accessing additional information about the item from a detail document, interactions with the item from the search results, or other interest factors described herein. The computer can tag that item as an item of interest and then determine whether to provide the supplementary information component that comprises one or more additional items associated with an attribute of the item or a related category associated with the item. If the computer determines to provide the supplementary information component, the component can be generated and provided to supplement the original search results.

The supplementary information component or supplementary information widget (used interchangeably) may be a graphical user interface object presented with an application adjacent to search results. The application may allow the users to interact with a service provider computer, such as to access web content (e.g., web pages, music, video, etc.).

The supplementary information component can comprise various information, that might include supplementary information associated with the search results. For example, the supplementary information component can comprise images or text of items related to the selected item. The supplementary information component may comprise links to additional information for related items. The information may be identified based on various calculations, data, and algorithms discussed herein.

In an illustrative example, a computer system can provide an electronic search engine (e.g., for retrieving data from a database or other data storage system) to a user accessing a web browser or other application. The user may enter a search query term or phrase (e.g., "2016 presidential elections") at a user interface of the web browser. The computer system may provide several search results associated with the 2016 presidential elections, including information about articles from potentially relevant sources (e.g., an article from Acme Co.). The user may select the article from Acme Co. and/or tag the article for further processing. Based at least in part on the tag, the computer system may determine that the article is associated with a particular category (e.g., "Acme Co. news") and/or a related category (e.g., "Acme Co. daily events"). The computer system may then determine whether relevant supplementary information is available. For example, the system may identify one or more other articles associated with the original category (news) or the related category (events). The computer system may then generate and/or provide the supplementary information as part of the search results. The user may then be able to select and/or tag the one or more other articles related to either category (e.g., without even providing an additional search query term). In this way, additional relevant content may be presented for discovery and retrieval by the user based at least in part on a single search.

In another illustrative example, a computer system can again provide an electronic search engine (e.g., for retrieving data from a database or other data storage system) to a user accessing a web browser or other application. When the user selects the article from Acme Co., the user may be provided with additional information about the article, including a detail document about the article, a page that is only associated with the article and not with other search results, etc. The user may request to return to the search results from this detail document. Based at least in part on the navigation to the detail document, the computer system may determine that the article is associated with a particular attribute (e.g., "Acme Co. news article") and/or a category (e.g., "Acme Co. daily events"), or identify related items associated with the attribute or category. The computer system may then generate and/or provide the supplementary information as part of the search results.

FIG. 1 illustrates an example flow for providing a search result enhancement component described herein, according to at least one example. The process 100 can begin with providing search results at 102. For example, a computer system 104 can provide one or more search results 106 at an application that is accessible by a user device 108, including a mobile device that displays a user interface. The computer system 104 and user device 108 may be similar to computers described throughout the specification, including a search engine computer 910 and user device 904, respectively, illustrated in FIG. 9.

The search results 106 may be provided in response to receiving a search query. For example, the computer system 104 can receive a search query from the user device 108. The user device 108 can provide the search query through an application that provides access to an electronic search engine. The user device 108 may provide the search query to retrieve any type of information or access to items.

The user interface may include a window for controlling, displaying, or otherwise processing search queries and search results. The user interface can display the search results at the user device 108 and/or access the computer system 104 via an application with a network connection to review the search results directly.

The search results 106 may comprise an item 112. The item 112 may include various information, including an image or text, link to additional detail, or data that corresponds with a particular object (e.g., an electronic item, a physical object, etc.). For example, the item 112 may be a news article. In another example, the item 112 may be a link to a corporation's network page. In yet another example, the item 112 may be consumable and/or available for purchase from an electronic marketplace. In still another example, the item 112 may include a book or other document stored and organized in association with the computer system 104. Other electronic or non-electronic objects can be considered items.

The item 112 may be associated with one or more categories, attributes, or programs. For example, a category may include news articles, apparel, sporting goods, books, various types of media (e.g., Digital Versatile Discs (DVD), digital files, etc.), electronics, or other methods of describing an item 112 or an attribute of the item. The item may also correspond with one or more attributes (e.g., color, size, title, author, etc.) or programs (e.g., a priority delivery program, a food delivery program, a program for particular groups (parents, mothers, dieters, etc.), or the like). In some examples, the category may describe an attribute of item 112. As a sample illustration, when item 112 is a link to a laptop offered through an electronic marketplace, the category may be "offered item," "Acme Co. laptop," "electronics," "20 inch screen," or the like. The attribute may be "blue" or "small" and the program may include a priority delivery program.

One or more attributes may describe item 112. For example, attributes may describe multiple items across multiple categories, whereas a category may be limited to a particular type of item. For example, items may be described by certain attributes (characteristics) such as a size (e.g., "medium,") or a color. Items that share attributes may be found in different categories such as shirts, pants, grills, apples, and/or laptops. Each of these items may correspond with various categories, including clothing, home goods, fruit, or electronics. In some examples, an attribute may be a category. As another illustration, a disc that is placed in a camera may include attributes of processor, location of manufacture, size, or other descriptors that items share across categories. Additionally, the category of an item may be an attribute of the item, since it describes a characteristic of the item.

One or more programs may correspond with item 112. For example, the item may be offered by a priority delivery program (e.g., a service computer that ships items within a shortened timeframe from other standard programs, etc.). In another example, the item may be offered by a food delivery program (e.g., a service computer that provides a food ordering and delivery service, in addition to delivering non-food items, etc.). In yet another example, the item may be offered by a program that corresponds with a particular group of users (e.g., parents, mothers, dieters, etc.). The one or more programs may be used to help search for or index item 112 in the data store. In some examples, the users that search for the item and/or search results 106 may correspond with a program as well.

The user may satisfy a threshold value to order items that correspond with the program. For example, an attribute of the items may need to exceed the threshold value (e.g., at least $20, at least 5 items, etc.). In some examples, the searching user may be limited to order and/or view items in a program when that searching user is also associated with the program. In some examples, items associated with the program may be limited to the program and/or unavailable to users that are not associated with the program. The supplementary information component, when provided, can populate with additional items associated with the program (e.g., to help exceed the threshold, to help bring additional value to joining the particular program, etc.).

The categories may correspond with a hierarchy (e.g., using a binary search tree, N-node search tree, sub-categories, etc.). For example, the highest point of the hierarchy can correspond with the broadest parent categories. The child categories can be more narrow than the parent category. As a sample illustration, the parent category may include "offered items" and at least some of the child categories may include "electronics," "clothing," or "food." The child categories may be parent categories as well. For example, child categories to the "food" parent category can include "fruit," "meat," and "bread."

Categories may be more or less broad as well. For example, when the search query includes "Books about Acme Co.," the item may include a book entitled "History of Acme Co." The category associated with the book may include a portion of the title (e.g., "History" or "Acme Co."), author of the book (e.g., Jane Smith, etc.), availability location (e.g., at the library, at a book store, near the user device, etc.), or other descriptions.

In some examples, the user may interact with an element provided by the user interface. The element may enable configuration of an item from the search results and/or detail document from a list of a plurality of item attributes. For example, the element may receive a selection of "blue" (e.g., from a list of black, blue, white, and red, etc.) and "medium" (e.g., form a list of small, medium, and large, etc.) when the item includes a shirt. In another example, the element may receive a selection of "January 2016" when the item includes a series of news articles. The process may identify the interaction (e.g., a first interaction) with one of the elements provided by the user interface that identifies these attributes, categories, or programs. In some examples, the element may comprise a drop-down box, radio button, text box to type information, or other elements that might enable configuration of the item.

In some examples, the item may be placed in an interest queue, which may also be identified by the process. The item may be placed in the interest queue in response to a second interaction with a second element, including an add-to-cart button, a radio button, or other elements that might enable the item to be placed in and/or associated with the interest queue.

In some examples, the item may be placed in an interest queue based on other interactions. For example, the content item may be placed in the interest queue based at least in part on a receipt of a selection of the item. In some examples, the item may be placed in the interest queue after receiving a selection of the item (e.g., from the search results, from a detail document, etc.). In some examples, the item may be placed in the interest queue once the item is reviewed, accessed, or otherwise selected by the user.

The process 100 may also comprise determining a category, related category, program, or attribute at 120. For example, a computer system 104 can analyze the item 112 to determine the category. In some examples, the computer system 104 can query a data store 122 to identify the category from a category data table 124. The category data table 124 may include an identification of one or more items (e.g., Seattle, San Diego, Music, etc.) and a corresponding category associated with the item (e.g., news articles, etc.). The item may correspond with more than one category. For example, the item "Seattle" may correspond with "tourism," "coffee," "news," and "football" categories. As illustrated, the item "Seattle" is associated with category "news." Items "San Diego" and "Music" are also associated with "news." A related category may be the same category and also include "news." In some examples, the related category may be different (e.g., "news" vs. "history" or "news" vs. "article," etc.). In some examples, the related category may include a category related through the hierarchy. Other types of information may be stored with the data store 122 without diverting from the scope of the disclosure.

In some embodiments, the related category may be determined based at least in part on the related category being within the same parent category as the category (e.g., as illustrated in hierarchy of categories, etc.). For example, the categories "fruit" and "meat" are related categories because they include the same parent category, or "food." The parent category can correspond with multiple levels in the hierarchy, so that "fruit" and "meat" are related categories in the parent category "offered items."

Other information may be determined as well. For example, the computer system 104 can analyze the item 112 to determine an attribute associated with the item. This might include whether the item is on sale (e.g., offered at a discounted price), the location of the item, or other features of the item that might not describe physical characteristics of the item directly. However, in some examples, the attribute may help describe the item. As a sample illustration, the item may include a shoe and the attributes may include the size of the shoe, the color of the shoe, whether the shoe is on sale, the location of the shoe, the physical distance between the shoe and the user's location, and the like. Similarly, the category of the shoe may include "shoes" or "men's wearables."

The category, attribute, program, and/or related category may be determined when an interest in item 112 is identified and/or tagged. The interest in item 112 may be identified by an interaction with the item. For example, the computer system 104 may receive a request to provide additional information about item 112. This may be identified when a user selects an item from the search results 106. In some examples, the interest in the item may be identified when the computer system 104 receives a request for information (e.g., a document that details information about the item, an interaction with a document that details information about the item, etc.). Other identifications of interest in an item may be identified throughout the disclosure as well.

The interaction may correspond with an interface element. For example, the interface element may include a graphical representation of the item in the search results (e.g., a title from an article surrounded by a box, image of an item associated with a link identified in the search results, etc.). In some example, the element may include a drop down menu, quantity incrementor, or other user interface component that can receive information from the user device (e.g., to alter the item presented by the interface element, to identify whether the item with the altered input is available, etc.). By interacting with the interface element, the user device 108 may select, highlight, or tap on the interface element to indicate an interest in the corresponding item.

Interest in the item may be identified numerous ways. For example, the indication of interest in the item is identified by selection of the item. The user may select the item by tapping, clicking, highlighting, or otherwise activating the item. In another example, the indication of interest in the item is identified by navigation to an item detail document associated with the item. The item detail document can provide information about the item (e.g., in addition to the information provided in the search results, etc.). The item detail document may appear at a different location than the location of the one or more search results. This may include a different network page and/or updated interface that displays the item detail document instead of (or in addition to) the search results.

Other interactions may indicate interest in the item. For example, the user may select, tap, or gesture in association with the item. A gesture may include waiving an object in front of a camera provided by the user device and/or swiping the screen associated with the user interface. The user device can receive the interaction data (e.g., moving the object from left to right, the speed of the moving object toward the screen, etc.) and transmit the interaction information to the computer system 104 for processing.

The indication of interest in the item may be identified by adding the item to an interest queue. For example, the item may be selected to be included in an interest queue. The interest queue may include a list of items. In some examples, the interest queue may be similar to an electronic shopping cart and/or a virtual shopping cart in an electronic marketplace. The computer device may offer the item after a payment transaction is initiated and/or conducted to obtain one or more items associated with the interest queue. The interest queue can identify the items that the user has decided to purchase by adding those items to the electronic shopping cart. The electronic marketplace may include multiple merchants that are accessible with a single interest queue. The interest queue may be configured to present the item in the interest queue and/or electronic shopping cart as an item chosen to order from the electronic marketplace.

Figure 2:
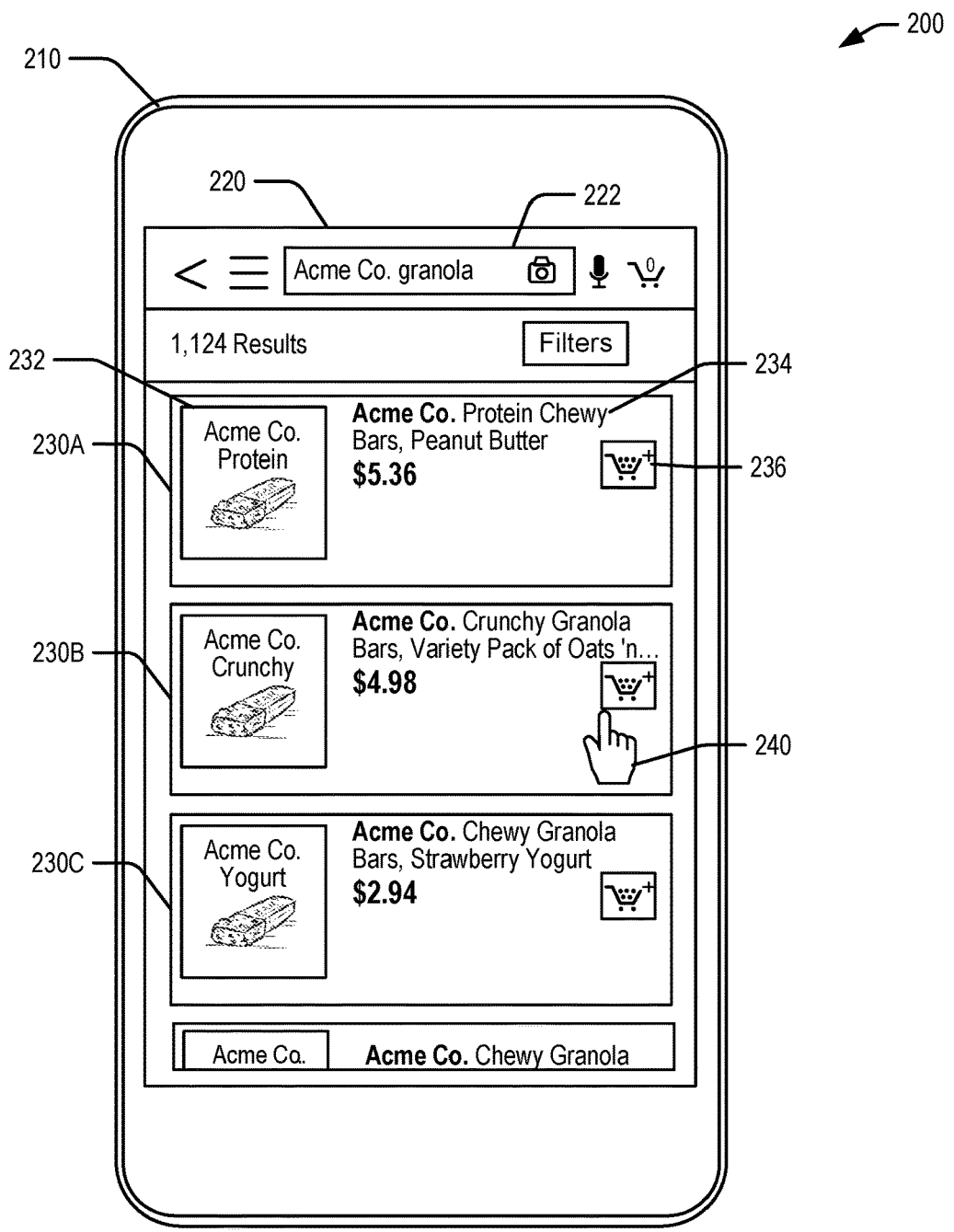
FIG. 2 illustrates a user interface described herein, according to at least one example.

The interest queue may be accessible on the user interface, as illustrated in FIG. 2. For example, a link to the interest queue may be displayed on a user interface that also displays the one or more search results. A link to add an item to the interest queue may be provided with the item (e.g., adjacent to, within an interface object associated with the item, etc.). Additional details regarding the interest queue displayed on the user interface is discussed with FIG. 2.

The indication of interest in the item may be identified by interacting with the search results and/or details associated with the item. For example, the search results may be provided and a first interaction with the search results may be received. This first interaction may correspond with a request for information about the item, which may correspond with providing the additional information about the item, including item details (e.g., attribute(s), categories, program(s), etc.) and/or a document that comprises the item details. A second interaction may also be received. The second interaction can correspond with the additional information and/or document that details information about the item. The first and second interactions may, at least in part, help identify an indication of interest in the item. In some examples, only a single interaction may be received (e.g., selecting an item, adding an item to an interest queue, selecting additional information about the item, etc.). Additional details regarding a user interface displays an item detail document and/or the document that details information about the item is discussed with FIG. 8.

The process 100 may also comprise generating a supplementary information component at 130. For example, when the computer system 104 can determine that a supplementary information component should be provided, the supplementary information component can be generated. The supplementary information component can be a user interface component that includes information associated with the search results, item, related items, and the like. In some examples, the search results 132 can be amended to include the supplementary information component 134 within the search results 132.

The supplementary information component can comprise one or more additional items associated with the category, attribute, program, and/or related category. The supplementary information component can comprise an image and/or text of a second item that shares the attribute and/or from the related category. For example, the item and the category associated with the item are identified as "Seattle" and "news," respectively. The related category to "news" may be "history book." In some examples, an image and/or text of a second item from the category "history book" can be provided with the supplementary information component, including a history book about Seattle. Additional illustrations are provided with FIG. 4.

The supplementary information component can comprise information based at least in part on an indication of interest with previous search results. For example, the computer system 104 can receive a first search query and provide first search results in response to that query. The computer system 104 can receive a second search query and provide second search results in response to that second query. The computer system 104 may receive an indication of interest in an item from the second search results and provide a supplementary information component that includes information associated with the first search results. The information associated with the first search query may be stored with the user's profile and/or search history. In some examples, the information included with the supplementary information component may be associated with a stored search history (e.g., with a user's profile, stored in a profile data store, etc.).

The supplementary information component may be provided independent of receiving a search query. For example, the supplementary information component can be provided without an indication of interest in an item. In some examples, the supplementary information component can be provided in response to an indication of interest in an item that was provided without also receiving a search query for the item.

The process 100 may also comprise determining whether to generate a supplementary information component. In some examples, the determination is based at least in part on a probability of adding the item to an interest queue. For example, previous users may select the item and only two-percent of those users may add the item to an interest queue. Another item may correspond with a 95% add-to-queue probability. In this example, when the user selects the item associated with 95%, it may be likely that the item will be added to the interest queue. When added, the supplementary information component may populate with related items that would supplement the item after it is added to the interest queue (e.g., additional articles to supplement understanding of an article, accessories for a laptop, etc.).

In another example, the determination as to whether to generate the supplementary information component can depend in part on a user's profile. For example, the user's profile may indicate a history of interest in Seattle tourism articles. When an item appears in search results associated with that category, a related category, or a parent category, the supplementary information component may be generated based in part on the probability of the user's interest in the corresponding item in that category. In another example, the user profile may indicate an order history of Acme Co. apples in the user's profile. When the search results return an item in that category (e.g., Acme Co. apples), a related category (e.g., Beta Co. apples), a parent category (e.g., apples), or other similar categories in a hierarchy, the supplementary information component may be generated based in part on the probability of the user's interest in that category.

Various probability algorithms may be used. For example, a multi-armed bandit model may first identify whether user devices interact with an item and/or add the item to an interest queue. For the items that are receiving interest based on navigating to the item through a supplementary information component, the supplementary information component may continue to be provided. For the items that are not receiving interest, the supplementary information component may be provided to help increase the interest.

Other users may test the probability algorithms as well. For example, a first supplementary information component can be shown to a group of users and a second supplementary information component can be shown to the same group or a second group of users. The interest in the item(s)

provided with the supplementary information component may be determined, so that the supplementary information component that corresponds with the greater interest can be identified. The indication of interest in the items can also be determined when the items are organized and/or sorted (e.g., based in part on a user's profile, based in part on adding one or more items to an interest queue, etc.).

In some examples, the supplementary information component may not be generated when the interaction with the item(s) provided in the supplementary information component is below a threshold value (e.g., 5%, 95%, more than 100, etc.). The threshold value may correspond with a predefined value. For example, one hundred users may interact with items in a first category and two hundred users may interact with items in a second category. The supplementary information component may be provided with the user interface associated with the item for the second category because more users interact with it. The supplementary information component may not be generated for users that interact with the item in the first category, based in part on the threshold value. In some examples, the supplementary information component may be generated for the first category to help generate more interest.

In some examples, the threshold value may be based at least in part on a number of interactions with the category by other users. For example, the other users may interact with category A one hundred times during a day and the other users may interact with category B two hundred times during the day. When the threshold value corresponds with interacting with a category more than one hundred times, the supplementary information component may be generated and provided for items associated with category B and not for items associated with category A.

In some examples, the threshold value may correspond with an interest queue. For example, other users may select item A and item B during a day (or other time period). The other users may add item A to an interest queue 5% of the time and add item B to an interest queue 95% of the time. The supplementary information component may be generated and provided for item B but not for item A because the percentage of adding the item to the interest queue after selecting the item for item B exceeds a threshold value (e.g., 50%, etc.).

In some examples, the threshold value may correspond with a program. For example, the user may be offered free shipping (e.g., or some other discount or goal, etc.) if the value of the items in the interest queue exceed the threshold value. The computer may limit the items available for free shipping to items associated with a particular program, but allow items from various categories and/or items associated with various attributes to be included.

The determination not to generate the supplementary information component may be based in part on a variety of factors, including other users' browsing history with items, interactions with similar items, user profile data, and the like. The variation may attempt to improve navigation traffic to the item.

The supplementary information component can be provided. For example, the user device that submitted the search query via an application can receive the supplementary information component through the same application. In some examples, the application and/or computer system 104 may limit the information provided to the user device by a program (e.g., a priority delivery program, a food delivery program, or the like), so only items associated with the program will be shown in the supplementary information component. The computer system 104 can provide the supplementary information component within a proximity of the item of the one or more search results. This may include providing the supplementary information component within an inch of the selected item, within a list of search results that include the item, in a box overlaid on top of the item, or other location adjacent to the item of the one or more search results.

Once the supplementary information component is provided, it may be selected. For example, the computer system 104 can receive an indication of a selection of the supplementary information component and provide information to the user interface in response. The information may include information about the related item included with the supplementary information component, information about the item, and/or one or more supplementary search results associated with the related category.

FIG. 2 illustrates a user interface described herein, according to at least one example. In example 200, a user device 210 is illustrated. The user device 210 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device 210 may be in communication with other computers via a network connection. Additionally, the user device 210 may be part of a distributed system managed by, controlled by, or otherwise part of other computers. Additional details of a user device are illustrated with FIG. 9.

The user device 210 may comprise a user interface 220. The user interface 220 may include a window for controlling, displaying, and otherwise processing search queries and search results. The user interface can display the search results at the user device and/or access the computer system 104 via an application with a network connection to review the search results directly.

The user interface 220 can comprise a text box 222 to receive a search query. For example, a user device can receive text from a user when the user taps or clicks letters (or numbers) to include with the search query. In another example, the text box 222 may be populated by receiving a voice command or an image of the item that would be searched. As illustrated, the text box 222 can receive "Acme Co. granola" as text, a voice command, or an image of the item "Acme Co. granola."

The search query may be submitted. For example, the user device 210 may transmit a communication that includes the search query to the computer system 104. The communication may indicate the search query term(s), user data (e.g., to be associated with a user profile at the computer system 104, etc.), and other information provided by the user device 210 and/or application. In some examples, the communication may be transmitted by the application on the user device 210.

The computer system 104 (not shown) may receive the search query and identify the corresponding search query terms. The computer system 104 can determine one or more items that correspond with the search query. The computer system 104 can generate the search results that comprise one or more items that correspond with the search query and transmit the search results in a communication via the network back to the user device 210.

The search results 230, as illustrated as 230A, 230B, and 230C, can comprise one or more items. For example, the search query includes "Acme Co. granola" and the search results include items associated with the term(s) "Acme Co. granola." The individual search results can each include an image 232, text description 234, link to an interest queue 236, and/or other relevant information (e.g., author/merchant, price, delivery information, etc.).

The search results 230 may be sorted, filtered, added, removed, or otherwise organized. For example, the search results 230 may be organized to display items toward the beginning of the search results when the item corresponds with an item that the user added to their interest queue.

Figure 3:
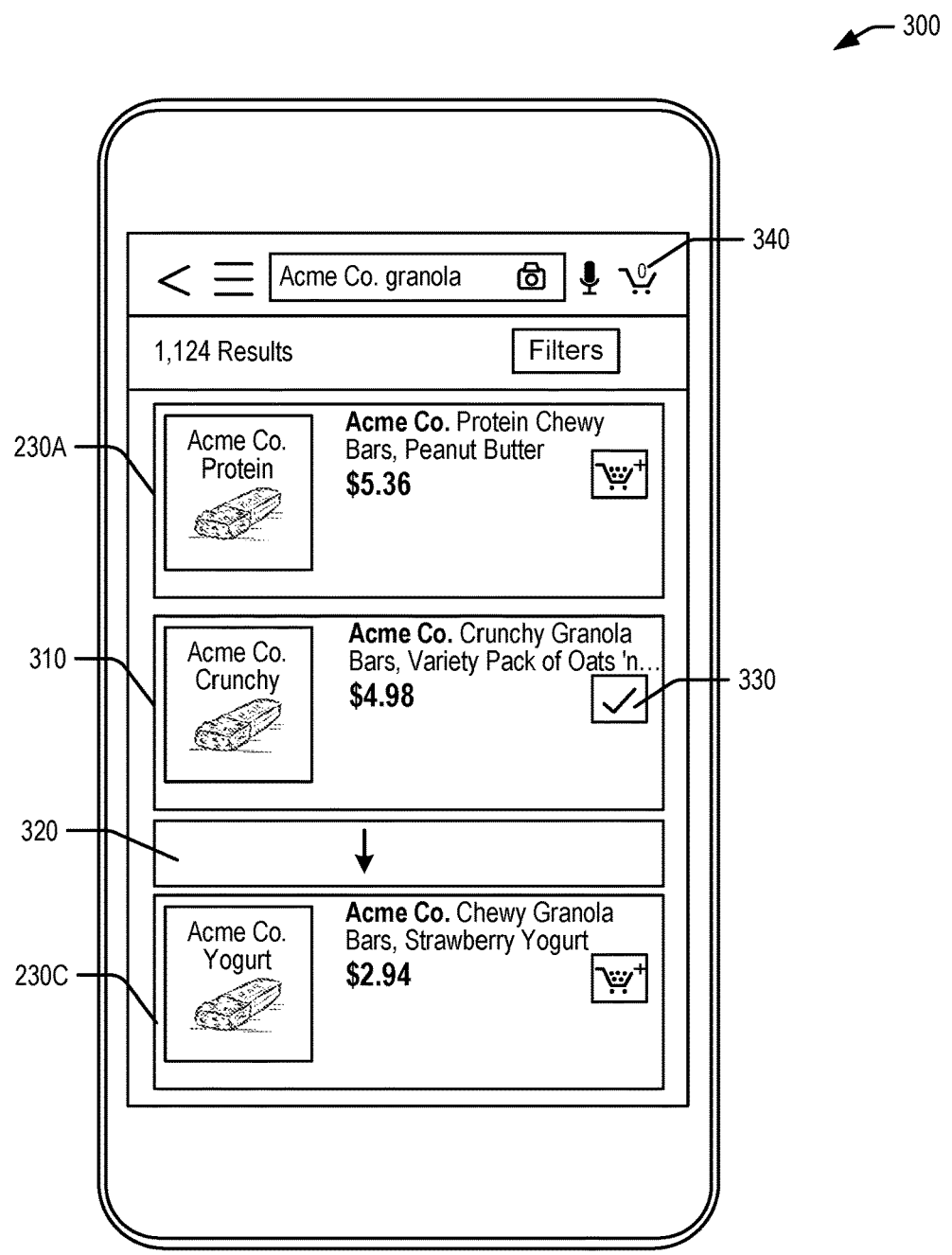
FIG. 3 illustrates a user interface described herein, according to at least one example.

As illustrated, the link to the interest queue for the second item may be selected at 240 and the user interface 220 may be updated, as shown in FIG. 3. FIG. 3 illustrates a user interface described herein, according to at least one example. In example 300, the interface 310 is updated to include search results 230, an item 310, a component 320, and a confirmation 330. The item 310 may be included with the search results 230.

Once an interest is identified with item 310 (e.g., via an interaction with the item 310), a component 320 may be generated and provided at the interface. The component 320 may include an interface object, animation, or other object placed adjacent to the item. The component 320 may be provided with or without the supplementary information component.

The component 320 can be populated with a supplementary information component once a determination is made as to whether to generate the supplementary information component. For example, the component can be generated based at least in part on an interaction with a representation of the item in a first portion of the user interface. The user interface can be updated with the component 320 to display in a second portion of the user interface, which may be adjacent to the item within the search results. A third portion of a user interface 340 can identify that the item was added to an interest queue (e.g., virtual shopping cart, electronic shopping cart, etc.).

The interaction may affect other aspects of the interface as well, including a confirmation 330. The confirmation 330 can confirm that the interaction was identified for item 310. For example, the confirmation 330 can confirm that the item was added to an interest queue. The confirmation 330 may include altering the interface from a symbol identifying an interest queue (e.g., an image of an electronic shopping cart associated with an electronic marketplace) to a checkmark.

In some examples, the confirmation 330 may include a quantity incrementor (not shown) instead of or in addition to an image corresponding with the interest queue. The quantity incrementor can identify a number of items that were added to the interest queue. For example, once the item 310 is selected by clicking on the interest queue button, the confirmation 330 may appear as a number "1" instead of a checkmark. The quantity incrementor can be incremented to add more items to the interest queue independent of selecting item 310 again.

Figure 4:
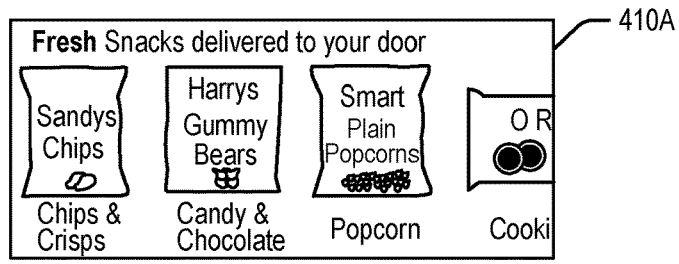
FIG. 4 illustrates examples of portions of a user interface described herein, according to at least one example.
Figure 4:
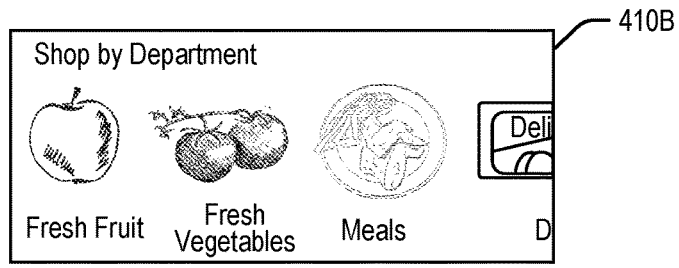
Figure 4:
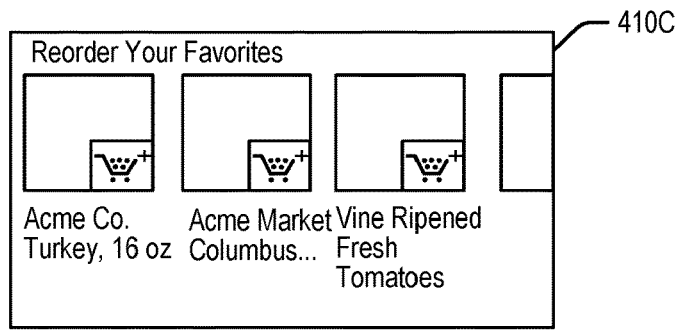

FIG. 4 illustrates examples of portions of a user interface described herein, according to at least one example. For example, the user interface can include a supplementary information component 410 as illustrated by 410A, 410B, and 410C. Any one of these examples may replace or supplement component 320 from FIG. 3.

The supplementary information component 410 can comprise an image or text of one or more items related to the selected item. The supplementary information component may also comprise links to additional information for related items and/or a link to add one or more items to an interest queue.

In supplementary information component 410A, items related to the selected item are shown in association with a related category or similar attribute. For example, a category associated with "Acme Co. granola" is "granola" with a parent category of "snack." A related category of "granola" might be "chips and crisps," "candy and chocolate," "popcorn," or "cookies." In some examples, any one of these categories may also have a parent category of "snacks."

As illustrated in supplementary information component 410A, one or more items that are within the same parent category as the item (e.g., Acme Co. granola) are provided with the supplementary information component 410A. The supplementary information component 410A may comprise links to a particular item in the related category and/or search results that comprise items that correspond with the related category.

In supplementary information component 410B, items from different parent categories are illustrated. For example, the parent category "snacks" may be different from parent categories "fresh fruit," "fresh vegetables," and "meat." The categories may be related to a parent category "food," such that there are first level categories (e.g., chips, candy, granola, etc.), second level categories (e.g., snacks, fresh fruit, fresh vegetables, etc.), and third level categories (e.g., food, etc.) in a hierarchy. The second level category may be a parent category to the first level category and the third level category may be a parent category to the second level category. Many other levels of categories in the hierarchy may be implemented without diverting from the scope of the disclosure.

The supplementary information component 410 may comprise items and/or categories based in part on their relation through the categories. For example, the supplementary information component 410 can comprise items form the same category, from related categories, from parent categories, or links to items associated with one or more categories. In some examples, the links may correspond with search results for items that correspond with a category, related category, or parent category.

In supplementary information component 410C, items from a user's profile are illustrated. For example, the user's profile may comprise items that the user interacted with during a session enabled through an application. A session may correspond with a user device's connection (via the application) to the computer system 104. For example, the user device may browse to the network page using a network browser application. Once accessed, the session may begin. The user device may access many different items and/or search results during the session. The user device may close the application or navigate away from the network page to end the session. In some examples, the session may correspond with logging in and logging out (e.g., providing user credentials, etc.).

In some examples, the items from the user profile may comprise recommended items based in part on items that the user interaction with during the current or previous sessions. The recommended items may correspond with items that are in a related category to the item that the user added to an interest queue during the previous session. Other methods of determining recommended items may be identified as well.

The determination of which supplementary information component may vary. For example, the determination may depend in part on a category or attribute of the item selected with FIG. 3. When the item is on sale, for example, the supplementary information component may comprise other items that are also for sale. When the item is a blue shoe (e.g., selected by an interaction with the item detail page from the user, etc.), the supplementary information component may comprise other blue shoes (e.g., instead of an advertisement for an item from a previous session, etc.). In some examples, the determination of which supplementary information component to provide may rely on the category (e.g., only clothing, etc.), attribute (e.g., only when the user selects a color other than the default color, etc.), or the related category of the item.

The items may be filtered. For example, the computer may identify one or more items associated with the user's profile. The items may be associated with the profile when the user selects the item or otherwise indicates an interest in the item. The items may be filtered to include a subset of items. For example, the filter may remove items that have not been added to an interest queue. In another example, the filter may remove items after a user purchases the item from an electronic marketplace.

An offer may be provided as well (not shown). The offer may correspond with an item. The item included with the offer may be related to a selected item (e.g., by a related category, associated with a previously-added item to an interest queue, etc.). The item in the offer may not be previously selected. In some examples, the item included with the offer may correspond with a predicted interest in the item using a prediction algorithm. For example, when a majority of users that select the first item to add to an interest queue and also select a second item to add to the interest queue, the second item may be included with the offer. In some examples, the offer may include a link to a category or search results independent of providing a search query. The offer, in some examples, may correspond with an item identified with the user's profile.

The supplementary information component may correspond with a timeframe. For example, during holiday shopping times in December, the supplementary information component may be generated and provided more often than other times during the year. The contents of the supplementary information component may also be affected by the timeframe (e.g., more items associated with a "kids toys" category than edible goods, etc.).

Figure 5:
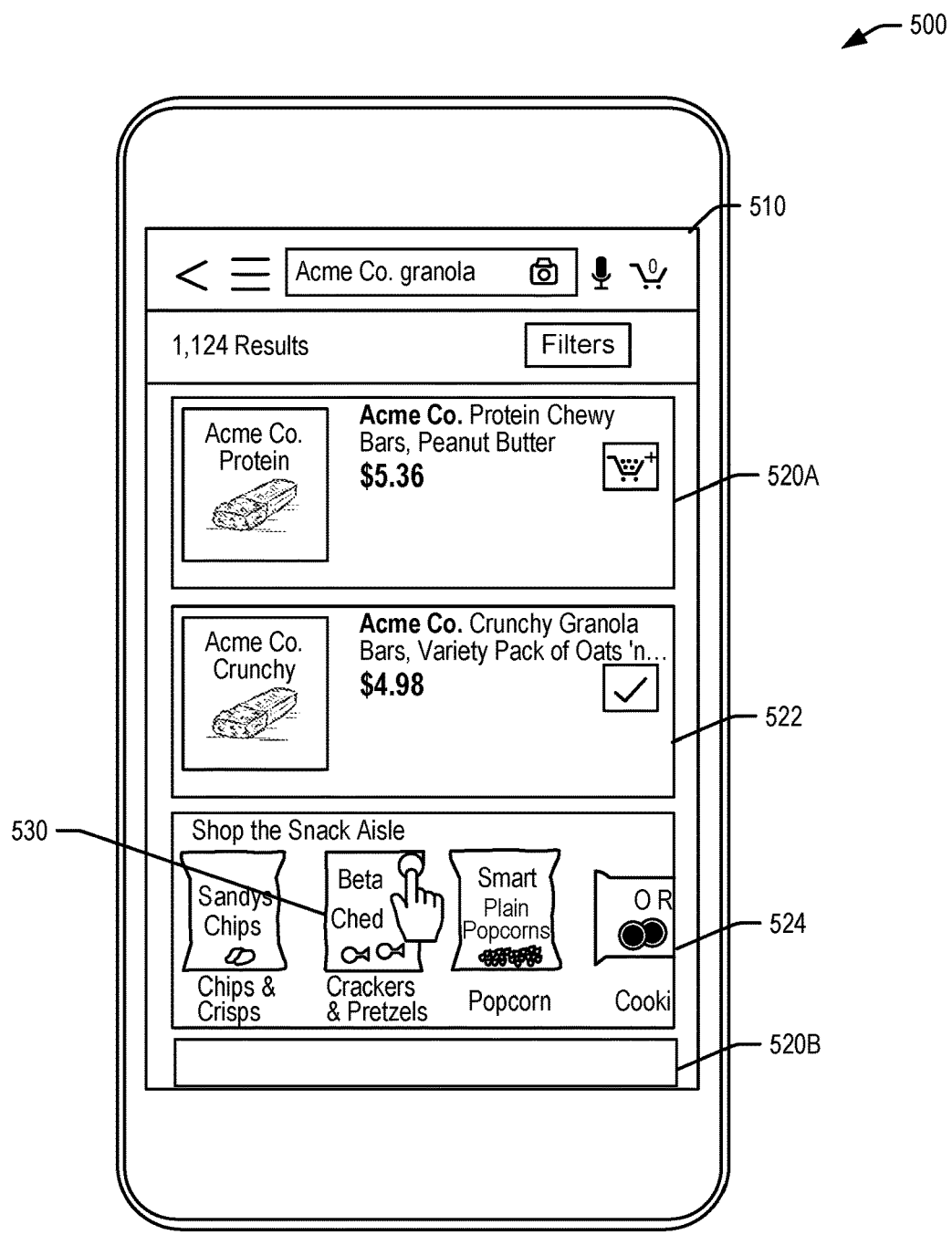
FIG. 5 illustrates a user interface that displays the supplementary information component described herein, according to at least one example.

FIG. 5 illustrates a user interface that displays the supplementary information component described herein, according to at least one example. In example 500, the interface 510 includes search results 520, which are illustrated as 520A and 520B, the item 522, and supplementary information component 524. The supplementary information component 524 may correspond with the supplementary information component 410A.

As illustrated in example 500, a first portion of a user interface includes search results 520 and a second portion of the user interface includes the supplementary information component 524. In some examples, the search results 520 and the supplementary information component 524 may be provided adjacent to each other in the same portion of the user interface.

In some examples, an interaction may occur with the supplementary information component 524 and supplementary search results may be provided. For example, the interaction may occur with item 530 and the interface can update with the supplementary search results, as illustrated with FIG. 6.

Figure 6:
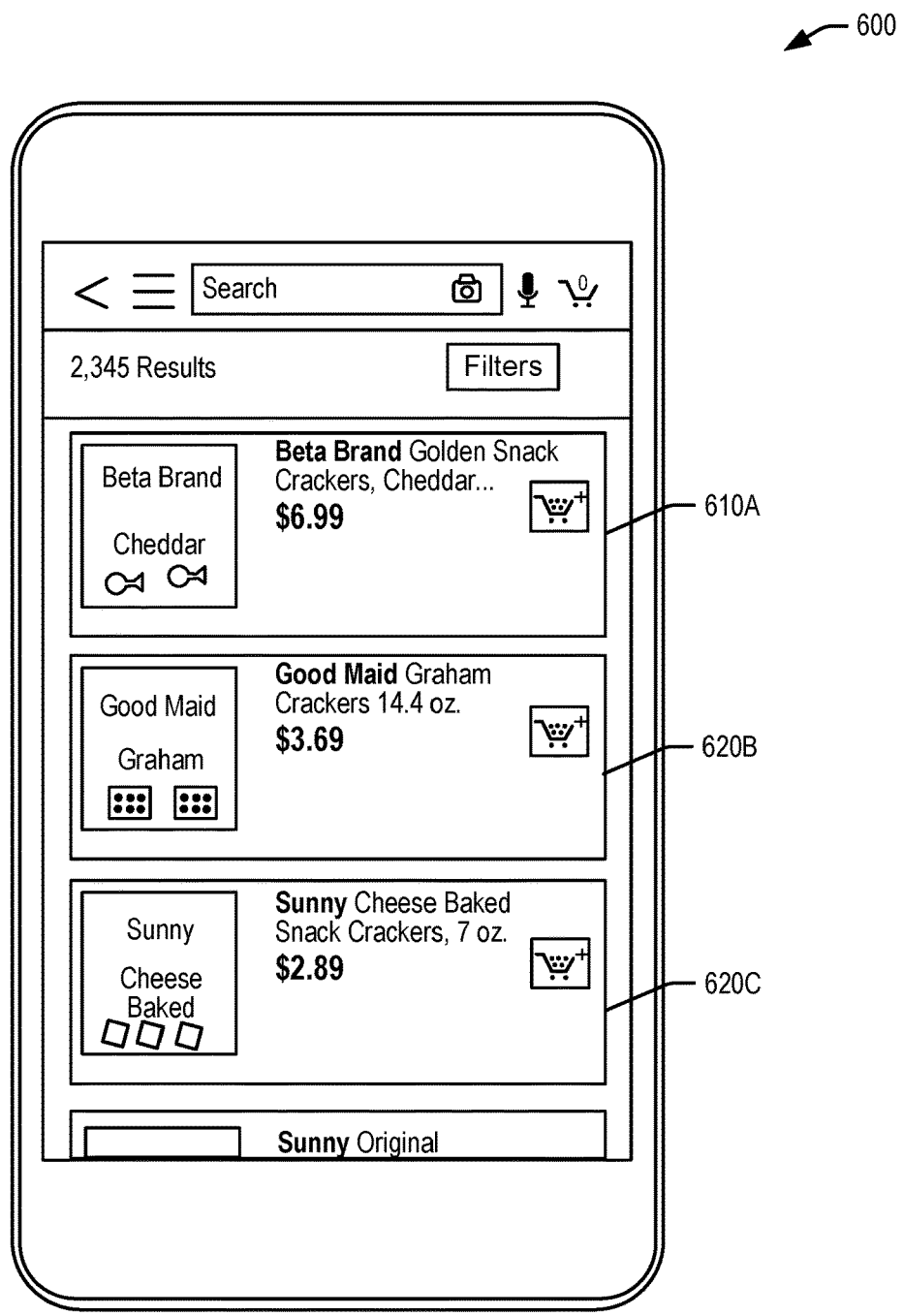
FIG. 6 illustrates a user interface described herein, according to at least one example.

FIG. 6 illustrates a user interface described herein, according to at least one example. In example 600, items 610 (illustrated as 610A, 610B, and 610C) are provided. The items 610 may share a parent category with item 310, or the categories associated with items 610 may be related to one or more categories of item 310 of FIG. 3. As illustrated, the search results in example 600 are provided independent of receiving a search query.

Figure 7:
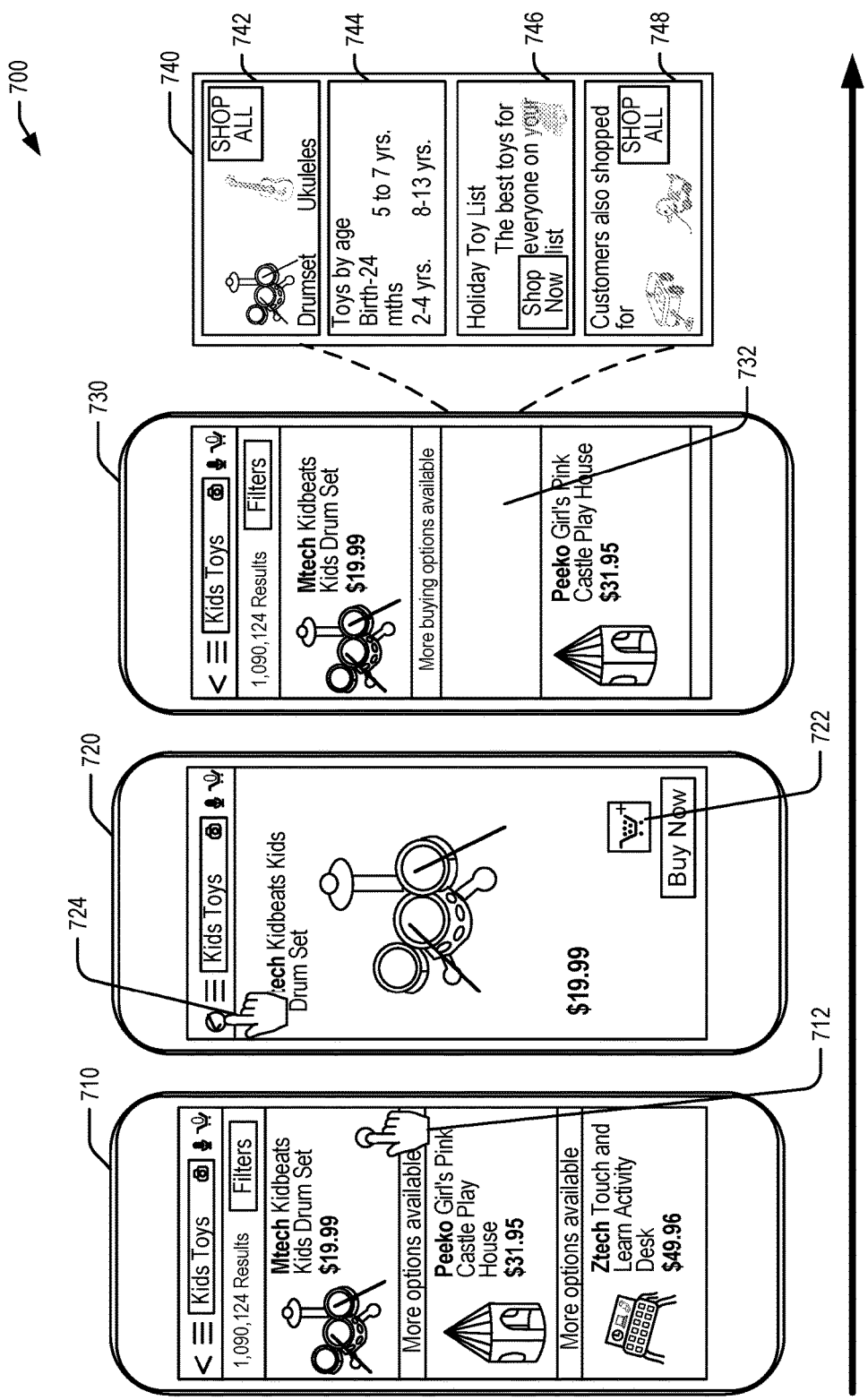
FIG. 7 illustrates a user interface described herein, according to at least one example.

FIG. 7 illustrates a user interface described herein, according to at least one example. In example 700, a user interface is illustrated. At step 710, the user interface can provide search results in response to search query "kids toys." An interaction with the first item (e.g., "Mtech Kidbeats Kids Drum Set") may be identified when the item is selected by a cursor 712 operated by the user device (e.g., or by tapping, clicking, highlighting, gesturing, etc.).

At step 720, the user interface can provide an item detail document associated with the item. The item detail document can include information about the item. In some examples, the item detail document can provide a link to add the item to an interest queue 722. From the item detail document, the cursor can navigate away from the item detail document using a link 724 provided by the item detail document (e.g., by selecting "back," "forward," or an alternative destination, etc.).

In some examples, the user may interact with the user interface before navigating away from the item detail document. For example, the user may provide a size or select a color for an item provided by the item detail document. In some examples, the user may provide a shipping address or other identifying information while interacting with the item detail document before navigating away.

In some examples, the user may navigate away from the item detail document in response to information provided with the document. For example, the user may provide a shipping address and the item detail document can update to show an additional shipping cost to that address. The user may navigate back to the search results in response to receiving the information (e.g., to find another item without the additional shipping cost, etc.). In another example, the user may provide attribute selections for the item (e.g., pink, medium, other interface elements that allow the user to manipulate the item, etc.). Once the interaction is received from the user, the user may identify that the item provider is unknown and/or not associated with the computer that provides the user interface (e.g., an item provider that is not included with the electronic marketplace, a third party merchant, etc.). The user may again decide to navigate back to the search results in response to receiving the information (e.g., to find another item from a different item provider, etc.).

At step 730, the user interface can provide the search results in response to the navigation. The search results can include a supplementary information component 732 adjacent to the selected item. Some examples of information provided with the supplementary information component 732 are illustrated in examples 740.

The supplementary information component 732 may include other items that share a related category 742. For example, a category associated with "Mtech Kidbeats Kids Drum Set" (the item) may include "kids drum sets" with a parent category of "musical instruments." A related category of "kids drum sets" might be "drum sets," "ukuleles," or "harmonicas." In some examples, any one of these categories may also have a parent category of "musical instruments."

The supplementary information component 732 may include a list of related categories 744. For example, when the parent category is "musical instruments," the child categories (e.g., category and related category, etc.) may comprise "birth to 24 months," "2-4 years," "5-7 years," "8-13 years," and "14 years and up." These categories may include a filter of the parent category. In some examples, any of these categories may be related to the other categories with the same parent category. The supplementary information component 732 may also include an offer 746, advertisement, or items associated with one or more user profiles 748, as discussed herein.

In some examples, the supplementary information component 732 may include information associated with the interaction. For example, the item detail document may include a shoe and the user may select the color "blue" before navigating away from the item detail document. The supplementary information component 732 may comprise other shoes that are blue or other items that might be related to the interactions received from the user.

In another illustration, the item provided with the item detail document may include windshield wipers. The user may select a make and model of the vehicle that will use the windshield wipers, but then choose to navigate away from the item detail document (e.g., because the merchant does not provide windshield wipers for that make and model, because the price is too high, etc.). After navigating to the search results, the supplementary information component 732 can show other windshield wipers for the make and model of vehicle provided by the user (e.g., by storing the details of the interaction in a data store, by identifying the category, related category, attribute of the item, etc.).

Figure 8:
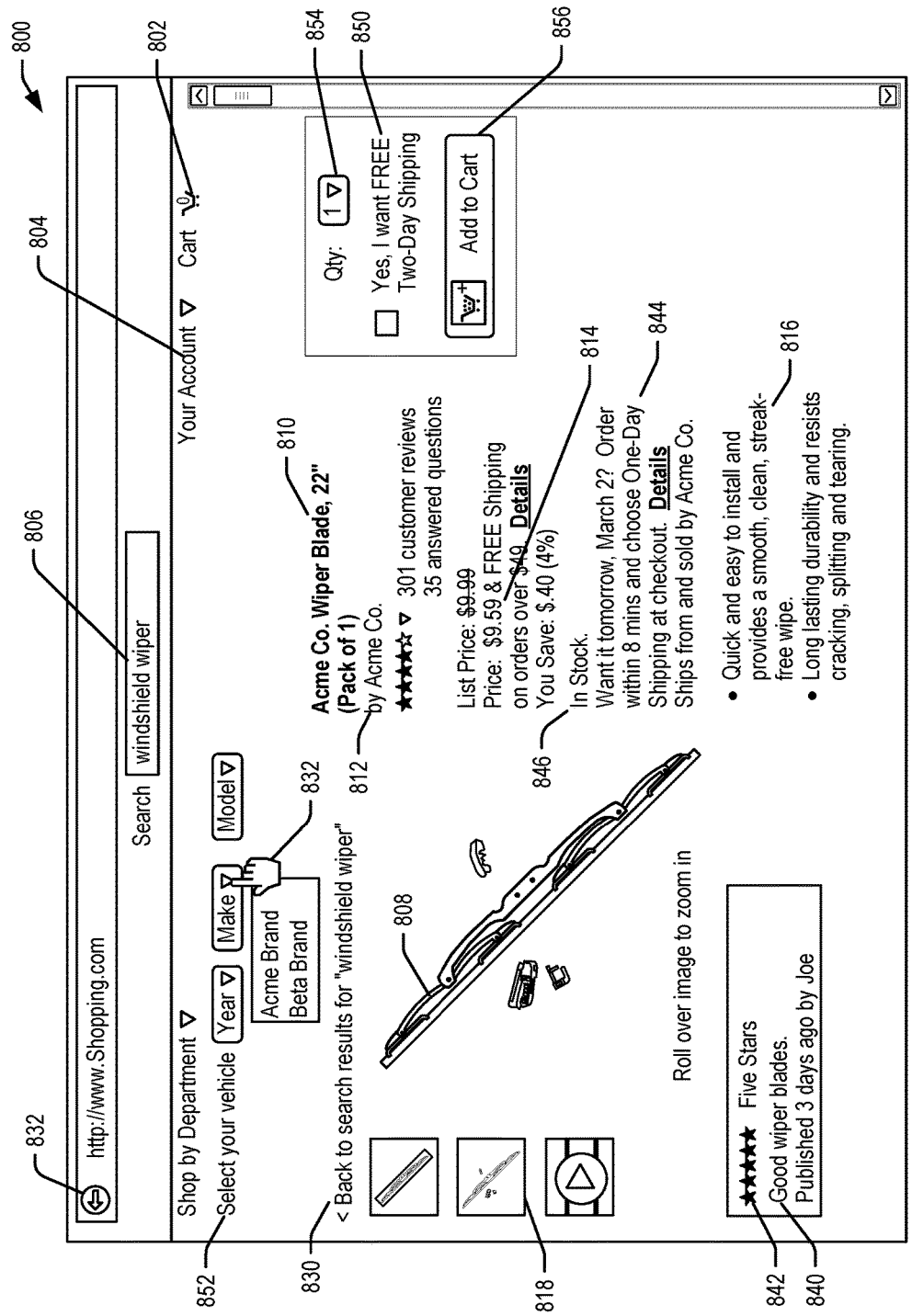
FIG. 8 illustrates a user interface described herein, according to at least one example.

FIG. 8 illustrates a user interface described herein, according to at least one example. In example 800, a user interface displays an item detail document. The document may also comprise a link to the interest queue 802, link to a user profile 804, element to receive a search query 806, and/or an item 808. The document may provide details about an item, including a name 810 associated with the item, manufacturer 812, author, color, size, title, price 814, item details 816, and the like. The item may comprise related information associated with the item, including an image 818 or text, link to additional detail, or data that corresponds with a particular object (e.g., an electronic item, a physical object, etc.). In some examples, the user interface may provide the additional detail and/or data instead of a link to the data.

In some examples, the user interface may provide the item without a set of search results (e.g., user interface displays only one item at a time, etc.). The user interface may provide a single item on the user interface whereas the user interface that provides the search results may provide more than one item. In some examples, the document can be displayed by the user interface as a webpage and/or the document may comprise the user interface.

Example 800 illustrates various methods for returning to the search results from the detail document. For example, a first link 830 or a second link 832 may be provided to enable the user to return to a user interface that provided the search results. For example, the user may receive a first user interface with search results and select an item from the search results. A second user interface may be received by the user that provides detail about the selected item. The user may select a back button, link to a previous user interface in a navigation hierarchy, or otherwise return to the first user interface with the search results. In turn, the computer may provide the two user interfaces that are enabled to access each other through elements provided with the user interfaces (e.g., back button, return key, navigation hierarchy, etc.).

The user interface may comprise one or more categories, attributes, or programs. As discussed previously, categories may comprise, for example, news articles, apparel, sporting goods, books, various types of media (e.g., Digital Versatile Discs (DVD), digital files, etc.), electronics, or other methods of describing an item or an attribute of the item. Attributes may comprise, for example, color, size, title, author, etc. Programs may comprise, for example, a priority delivery program, a food delivery program, a program for particular groups (parents, mothers, dieters, etc.), or the like.

The user interface may comprise a category of the item, even if the category is not displayed. As illustrated in example 800, the item may comprise windshield wiper blades, one corresponding category may include "car parts," and an attribute associated with the item may include "Acme Co." associated with the manufacturer of the item. In some examples, the attribute may be displayed with the user interface and the category may not be displayed.

The user interface may comprise a review 840 or a rating 842 of the item. The rating or review may be received from other users in association with the item. While the terms "ratings" and "reviews" are often used interchangeable, generally, a rating may comprise a metric, number, or the like (e.g., a number of stars) that can provide an objective measure of an item while a review may comprise a description (e.g., text, audio, video, etc.) of the item and can be more subjective. Sometimes, a rating may be automatically generated based at least in part on a review, and sometimes a review may include an objective rating within the description.

The user interface may comprise shipping details 844 of the item. For example, a user may order an item from an electronic marketplace. The user interface may provide details about sending the item to the user (e.g., via 2-day shipment, ground transportation, etc.). Data associated with providing the item to the user may comprise a time of the purchase, a date of purchase, user device used to search for and order the item, shipping location (e.g., to, from, fulfillment center, etc.), method of payment, physical constraints associated with the shipping location, whether the item was ordered previously, and the like.

The user interface may comprise availability information 846 of the item. For example, the item may or may not be available immediately. The user interface can display information about when the item might be available to send to the user (e.g., available to ship on January 1st, one-day shipping available, etc.). The availability may be associated with the program as well. For example, the item may be "in stock" or "backordered" until some date. In some examples, the item associated with a "priority delivery program" may be able to provide the item to the user within one-day and display the identification of the program at the user interface. In some examples, the user interface may not display "one-day shipping" and instead may display the identification of the program 850.

The program may affect the user interface as well. For example, a program for particular group (e.g., parents, etc.) may provide information at the user interface that is more relevant to that group. The information relevant to the program may be identified through metadata (e.g., items with this information are selected more often than items without this information, etc.), profile information (e.g., a user's profile in the particular program identifies the information as important when choosing an item to order, etc.), clickstream analysis (e.g., items with this information are selected and added to an interest queue more often than items without this information, etc.), order history (e.g., items with this information are added to an interest queue more often than items without this information, etc.), and the like.

In some examples, a first user interface associated with the search results may allow filtering of the search results and a second user interface (e.g., user interface that displays the item, etc.) may correspond with that filter. For example, the computer may receive a search query for "apples," and the search results may comprise any item associated with "apples." The computer may receive an interaction with the first user interface that limits the search results to "apples from Washington" and "priority delivery program." When the user selects an item from the filtered list of search results, the second user interface may display the filter (e.g., "this is an apple from Washington available through the priority delivery program!") and/or limit the item displayed by the second user interface to an item that corresponds with the filter from the first user interface.

The user interface may enable one or more interactions. For example, the user interface may receive an interaction with an element 852 provided by the user interface. As displayed in with example 800, the element 852 may comprise a drop-down list to select a year (e.g., 2016, 2015, etc.), make (e.g., Acme Co., Beta Brand, etc.), or model (e.g., Truck Model A, Car Model B, etc.) of the item (e.g., windshield wiper blades, etc.). The user may select a button provided by the user interface to provide this information, select the information from a drop-down menu, or other methods of providing information.

The user interface may comprise a quantity incrementor 854. The quantity incrementor 854 can identify a number of items that were added to the interest queue 856. For example, once the item is selected by clicking on the interest queue 856 button, the quantity incrementor 854 can correspond with a number "1" instead of a checkmark. The quantity incrementor can be incremented to add more items to the interest queue 856 independent of selecting item again.

Figure 9:
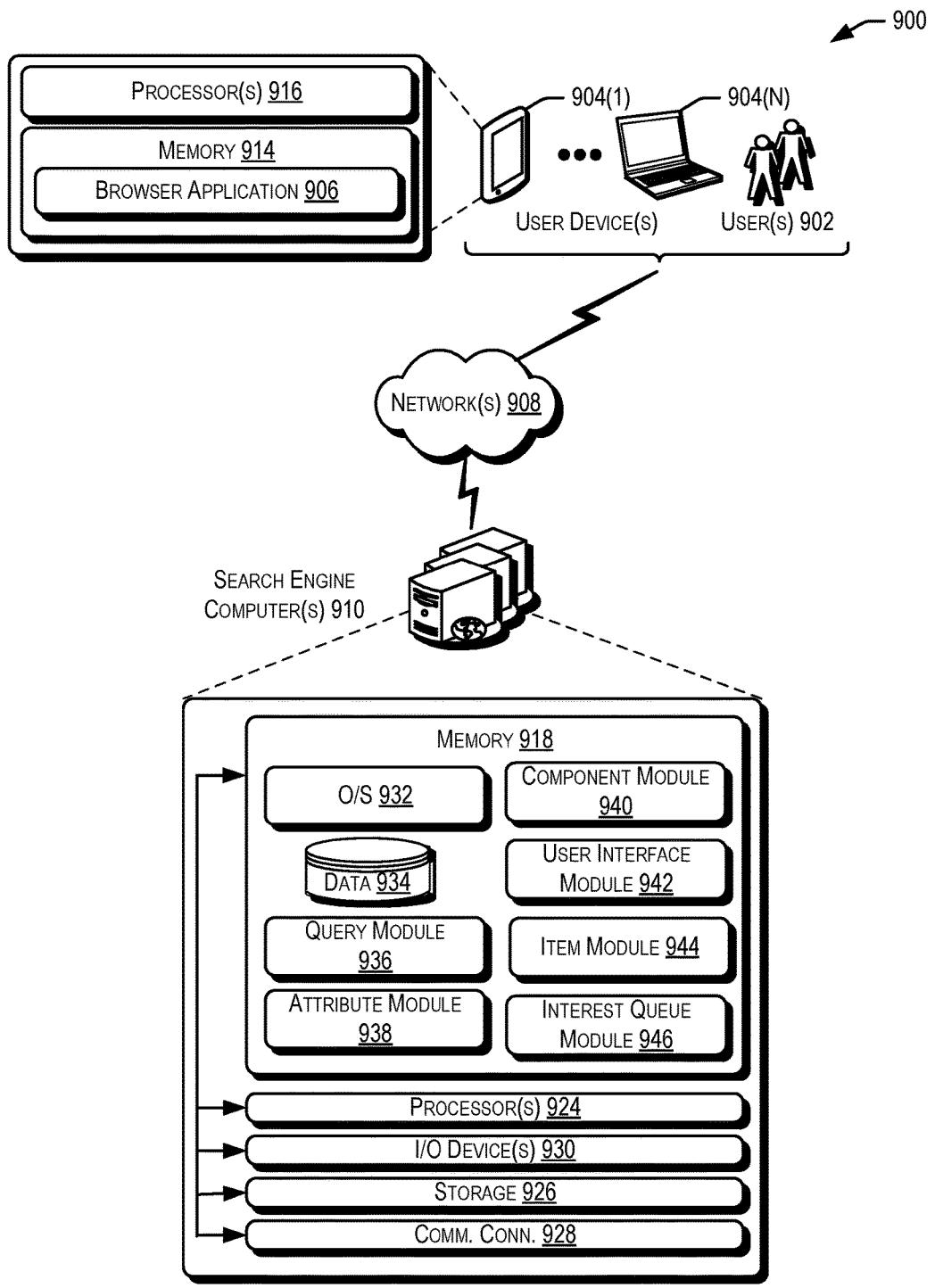
FIG. 9 illustrates an example architecture for providing a supplementary information component described herein that includes a search engine computer and/or a user device connected via one or more networks, according to at least one example.

FIG. 9 illustrates an example architecture for providing a supplementary information component described herein that includes a search engine computer and/or a user device connected via one or more networks, according to at least one example. In architecture 900, one or more users 902 (i.e., web browser users) may utilize user computing devices 904(1)-(N) (collectively, user devices 904) to access an application 906 (e.g., a web browser), via one or more networks 908. In some aspects, the application 906 may be hosted, managed, and/or provided by a computing resources service or service provider, such as by utilizing one or more service provider computers and/or one or more search engine computers 910. The one or more search engine computers 910 may, in some examples, provide computing resources such as, but not limited to, client entities, low latency data storage, durable data storage, data access, management, virtualization, cloud-based software solutions, electronic content performance management, etc. The one or more search engine computers 910 may also be operable to provide web hosting, computer application development, and/or implementation platforms, combinations of the foregoing, or the like to the one or more users 902. The one or more search engine computers 910, in some examples, may help provide a supplementary information component to one or more user devices 904 via a user interface.

In some examples, the networks 908 may include any one or a combination of many different types of networks, such as cable networks, the Internet, wireless networks, cellular networks and other private and/or public networks. While the illustrated example represents the users 902 accessing the application 906 over the networks 908, the described techniques may equally apply in instances where the users 902 interact with the search engine computers 910 via the one or more user devices 904 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 906 may allow the users 902 to interact with a service provider computer, such as to access web content (e.g., web pages, music, video, etc.). The one or more search engine computers 910, perhaps arranged in a cluster of servers or as a server farm, may host the application 906 and/or cloud-based software services. Other server architectures may also be used to host the application 906. The application 906 may be capable of handling requests from many users 902 and serving, in response, various item web pages. The application 906 can provide any type of website that supports user interaction, including social networking sites, online retailers, informational sites, blog sites, search engine sites, news and entertainment sites, and so forth. As discussed above, the described techniques can similarly be implemented outside of the application 906, such as with other applications running on the user devices 904.

The user devices 904 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 904 may be in communication with the search engine computers 910 via the networks 908, or via other network connections. Additionally, the user devices 904 may be part of the distributed system managed by, controlled by, or otherwise part of the search engine computers 910 (e.g., a console device integrated with the search engine computers 910).

In one illustrative configuration, the user devices 904 may include at least one memory 914 and one or more processing units (or processor(s)) 916. The processor(s) 916 may be implemented as appropriate in hardware, computer-executable instructions, firmware, or combinations thereof. Computer-executable instruction or firmware implementations of the processor(s) 916 may include computer-executable or machine-executable instructions written in any suitable programming language to perform the various functions described. The user devices 904 may also include geo-location devices (e.g., a global positioning system (GPS) device or the like) for providing and/or recording geographic location information associated with the user devices 904.

The memory 914 may store program instructions that are loadable and executable on the processor(s) 916, as well as data generated during the execution of these programs. Depending on the configuration and type of user device 904, the memory 914 may be volatile (such as random access memory (RAM)) and/or non-volatile (such as read-only memory (ROM), flash memory, etc.). The user device 904 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 914 may include multiple different types of memory, such as static random access memory (SRAM), dynamic random access memory (DRAM), or ROM.

Turning to the contents of the memory 914 in more detail, the memory 914 may include an operating system and one or more application programs or services for implementing the features disclosed herein, such as via the browser application 906 or dedicated applications (e.g., smart phone applications, tablet applications, etc.). The browser application 906 may be configured to receive, store, and/or display a website or other interface for interacting with the search engine computers 910. Additionally, the memory 914 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 902 provided response to a security question or a geographic location obtained by the user device 904.

In some aspects, the search engine computers 910 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the search engine computers 910 may be in communication with the user devices 904 and/or other service providers via the networks 908, or via other network connections. The search engine computers 910 may include one or more servers, perhaps arranged in a cluster, as a server farm, or as individual servers not associated with one another. These servers may be configured to implement the content performance management described herein as part of an integrated, distributed computing environment.

In one illustrative configuration, the search engine computers 910 may include at least one memory 918 and one or more processing units (or processor(s)) 924. The processor(s) 924 may be implemented as appropriate in hardware, computer-executable instructions, firmware, or combinations thereof. Computer-executable instruction or firmware implementations of the processor(s) 924 may include computer-executable or machine-executable instructions written in any suitable programming language to perform the various functions described.

The memory 918 may store program instructions that are loadable and executable on the processor(s) 924, as well as data generated during the execution of these programs. Depending on the configuration and type of search engine computers 910, the memory 918 may be volatile (such as RAM) and/or non-volatile (such as ROM, flash memory, etc.). The search engine computers 910 or servers may also include additional storage 926, which may include removable storage and/or non-removable storage. The additional storage 926 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 918 may include multiple different types of memory, such as SRAM, DRAM, or ROM.

The memory 918, the additional storage 926, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 918 and the additional storage 926 are all examples of computer storage media. Additional types of computer storage media that may be present in the search engine computers 910 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the search engine computers 910. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The search engine computers 910 may also contain communications connection(s) 928 that allow the search engine computers 910 to communicate with a stored database, another computing device or server, user terminals and/or other devices on the networks 908. The search engine computers 910 may also include I/O device(s) 930, such as a keyboard, a mouse, a pen, a voice input device, a touch input device, a display, speakers, a printer, etc.

Turning to the contents of the memory 918 in more detail, the memory 918 may include an operating system 932, one or more data stores 934, and/or one or more application programs or services for implementing the features disclosed herein including a query module 936, a category module 938, a component module 940, a user interface module 942, an item module 944, and/or an interest queue module 946. The modules may be software modules, hardware modules, or a combination thereof. If the modules are software modules, the modules will be embodied on a computer readable medium and processed by a processor in any of computer systems described herein.

The query module 936 may be configured to receive a search query and provide one or more search results. The search query may be received from a user interface that corresponds with one or more of the user devices 904. The one or more search results can comprise at least an item.

The attribute module 938 may be configured to determine an attribute, category, category related to the item, or program associated with the item. In some examples, the attribute module 938 may be configured to determine a related category or parent category associated with the attribute. The category and/or attribute may be used to group the item with other similar items (e.g., based on the category and/or attribute, respectively, of the item, etc.). The attribute can include one or more categories and/or describe an aspect of the item (e.g., identified in metadata associated with the item, identified from an interaction with the user, etc.). The related category may be determined based at least in part on the related category being within a same parent category as the category.

The component module 940 may be configured to determine whether to provide a supplementary information component. The supplementary information component can comprise one or more additional items associated with the related category. Once determined, the component module

940 may be configured to generate and provide the supplementary information component. Generating the supplementary information component may be based at least in part on the determination satisfying a threshold value. The supplementary information component may be provided within a proximity of the item of the one or more search results.

The user interface module 942 may be configured to provide and update a user interface to display items, search results, a supplementary information component, item detail document(s), and the like.

The item module 944 may be configured to identify an item, add the item to a user's profile, and determine new items to associate with the user (e.g., based in part on a session and/or indications of interest in items, etc.). The item module 944 may also be configured to identify an indication of interest in the item (e.g., by a selection of the item, navigation to an item detail document associated with the item, etc.).

The interest queue module 946 may be configured to identify items that are associated with the interest queue. For example, when the item is selected, the item may be added to the interest queue. The interest queue module 946 may also be configured to increment a quantity of the item that corresponds with the interest queue. In some examples, the interest queue module 946 may help initiate a payment transaction to obtain one or more items from the interest queue from an electronic marketplace and/or merchant.

Figure 10:
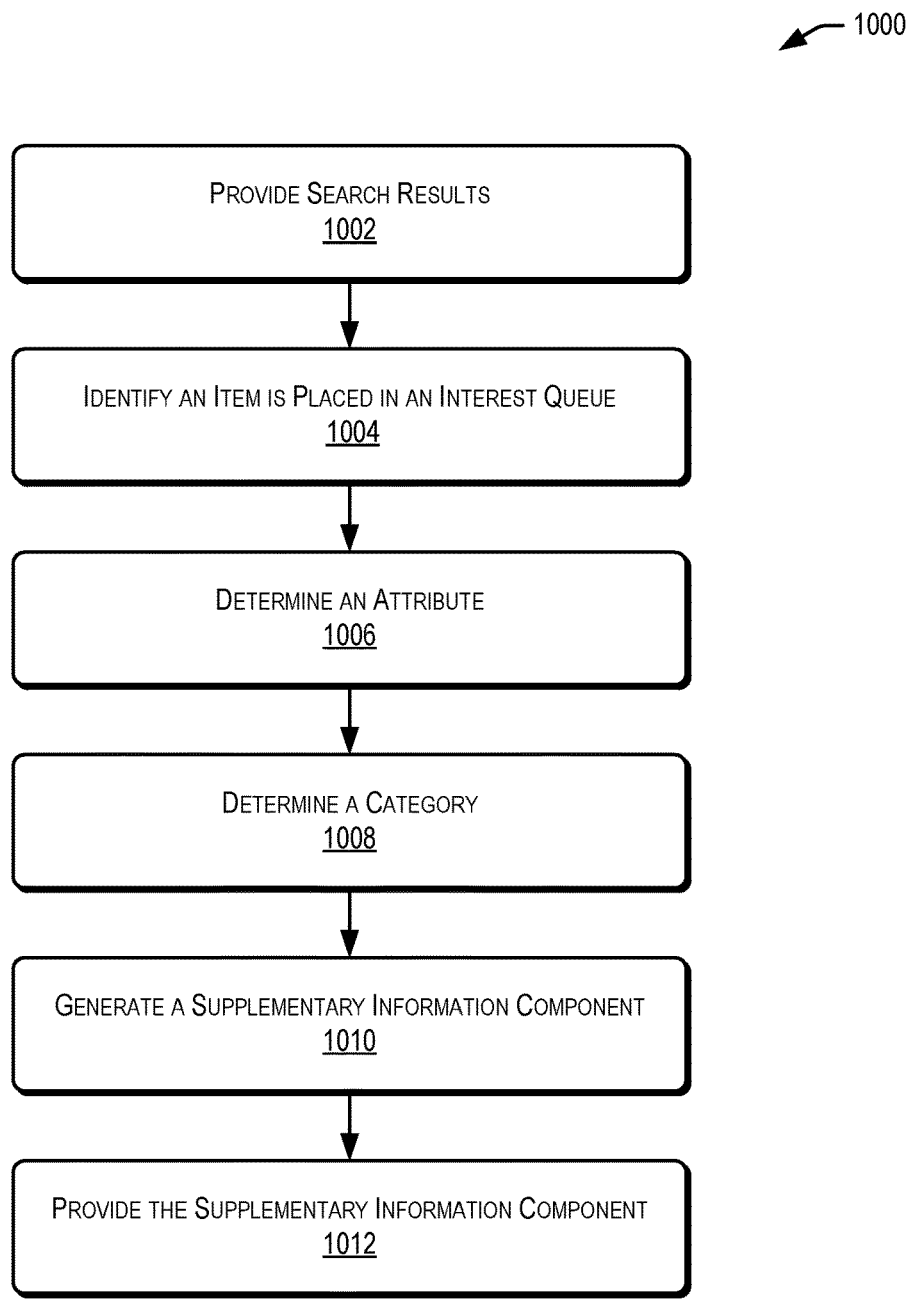
FIG. 10 illustrates an example flow diagram for providing a supplementary information component described herein, according to at least one example.

FIG. 10 illustrates an example flow diagram for providing a supplementary information component described herein, according to at least one example. In some examples, the one or more search engine computers 910 (e.g., utilizing at least one of the query module 936, category module 938, component module 940, user interface module 942, item module 944, and/or interest queue module 946) or one or more user devices 904 shown in FIG. 9 may perform the process 1000 of FIG. 10.

Some or all of the process 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1000 may begin at 1002 by providing search results. For example, the search engine computers 910 may receive a search query and provide search results in response to receiving the search query. In some examples, the search results may be provided independent of receiving a search query. The search results may be provided to a first portion of a user interface and comprise an item.

At 1004, the process 1000 may identify that an item is placed in an interest queue. For example, the search engine computers 910 may identify that an item has been placed in the interest queue after an interaction with an element provided with the user interface. The interaction may include clicking, tapping, or otherwise selecting the element. In some examples, the placement of the item in the interest queue may include interacting with the interface element that is configured to request the content item (e.g., request to order the item, request to receive additional information the item, request to add the item to a virtual shopping cart, etc.).

In some examples, the process 1000 may identify an indication of interest when the item is placed in the interest queue. For example, the search engine computers 910 may identify an indication of interest in the item of the one or more search results by identifying an interaction with a user interface element corresponding to the item. The interaction may include selecting the item, navigating to an item detail document associated with the item, selecting the item to be included in an interest queue, or other indications discussed herein.

At 1006, the process 1000 may determine an attribute. For example, the search engine computers 910 may determine an attribute based at least in part on adding the item to the interest queue and/or the interaction with an element corresponding to the item. The search engine computers 910 may also determine the attribute based in part on metadata associated with the item (e.g., the size of the item, the color identified by the user using a selection tool at the user interface, etc.). For example, the search engine computers 910 may provide a drop down menu that comprises colors for the item, which can be selected by the user at the user interface.

At 1008, the process 1000 may determine a category related to the item. For example, the search engine computers 910 may determine a category related to the item and/or a category associated with an item. The item category may be determined as well. The category related to the item may be determined based at least in part on being within a same parent category as the item category. In some examples, the search engine computers 910 may determine whether to provide a supplementary information component that comprises one or more additional content items associated with the category related to the item and/or item category.

At 1010, the process 1000 may generate a supplementary information component. For example, the search engine computers 910 may generate a supplementary information component that comprises one or more additional items associated with the attribute and/or category related to the item based at least in part on the indication of interest (e.g., based in part on a color selected by the user using a selection tool, based in part on data provided by the user with the item detail document, etc.). In some examples, the search engine computers 910 may also determine whether to provide a supplementary information component that comprises one or more additional items associated with the category. In some examples, the search engine computers 910 may generate the supplementary information component based at least in part on the determination satisfying a threshold value (e.g., a number of interactions with the category or attribute by other users, whether the items added to the interest queue exceed a threshold associated with a program, etc.).

At 1012, the process 1000 may provide the supplementary information component. For example, the search engine computers 910 may provide the supplementary information component for display adjacent to the first portion of the user interface. In some examples, the supplementary information component may be provided within a proximity of the item of the one or more search results. In some examples, the search engine computers 910 may update the user interface to provide the supplementary information component for display in a second portion of the user interface.

Once provided, the user device may interact with the supplementary information component. For example, the search engine computers 910 can receive an indication of a selection of the supplementary information component and provide one or more supplementary search results associated with the attribute and/or category (e.g., in response to the selection to add the item to an interest queue, in response to a selection to access an item detail document associated with an item in the supplementary search results, etc.).

Figure 11:
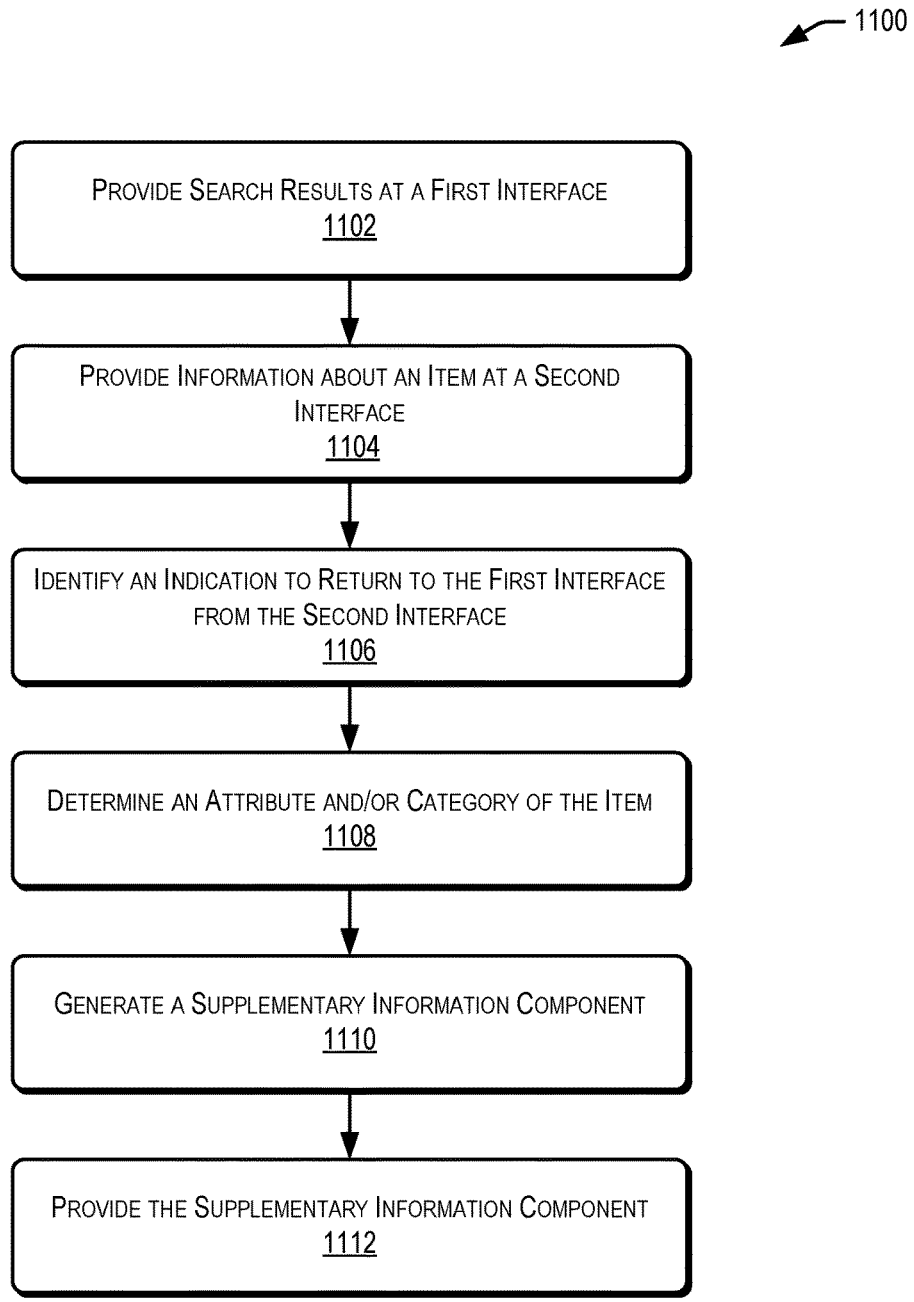
FIG. 11 illustrates an example flow diagram for providing a supplementary information component described herein, according to at least one example.

FIG. 11 illustrates an example flow diagram for providing a supplementary information component described herein, according to at least one example. In some examples, the one or more search engine computers 910 (e.g., utilizing at least one of the query module 936, category module 938, component module 940, user interface module 942, item module 944, and/or interest queue module 946) or one or more user devices 904 shown in FIG. 9 may perform the process 1100 of FIG. 11.

Some or all of the process 1100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1100 may begin at 1102 by providing search results. For example, the search engine computers 910 may receive a search query and provide search results in response to receiving the search query. In some examples, the search results may be provided independent of receiving a search query. The search results may be provided to a first portion of a user interface and comprise an item and/or a first user interface.

In some examples, the search engine computers 910 may receive a request for information about the item as well. The request may comprise selecting a link to the information about the item or other means of accessing an item detail document. The request for information may be received through an interaction with the one or more search results (e.g., by selecting an item from the search results, a first interaction, etc.).

At 1104, the process 1000 may provide information about an item. For example, the search engine computers 910 may provide a document that details information about the item. The document may comprise information as discussed throughout the application, including at FIG. 8. In some examples, the document may be provided in part on the interaction with the search results.

At 1106, the process 1000 may identify an indication of a second interaction. For example, the search engine computers 910 may receive an indication of a second interaction. The interaction may involve the document that details information about the item. The second interaction may, in some examples, comprise a selection of an option to review details about the item. In some examples, the interaction may comprise a request to return to the first interface with the search results from the second interface with the item details.

At 1108, the process 1000 may determine an attribute and/or category of the item. For example, the search engine computers 910 may determine an attribute with the item based at least in part on the second interaction (e.g., selection of an option to review details about the item, requesting to return to the search results, etc.). The search engine computers 910 may also determine the attribute and/or category based in part on metadata associated with the item (e.g., the size of the item, the color identified by the user using a selection tool at the user interface, etc.). For example, the search engine computers 910 may provide a drop down menu that comprises colors for the item, which can be selected by the user at the user interface.

The search engine computers 910 may also determine a category of the item. The category related to the item may be determined based at least in part on being within a same parent category as the item category. In some examples, the search engine computers 910 may determine whether to provide a supplementary information component that comprises one or more additional content items associated with the category related to the item and/or item category.

At 1110, the process 1000 may generate a supplementary information component. For example, the search engine computers 910 may generate a supplementary information component that comprises one or more additional items associated with the attribute and/or category related to the item based at least in part on the indication of interest (e.g., based in part on a color selected by the user using a selection tool, based in part on data provided by the user with the item detail document, based in part on selecting an option to review details about the item, etc.). In some examples, the search engine computers 910 may also determine whether to provide a supplementary information component that comprises one or more additional items associated with the category. In some examples, the search engine computers 910 may generate the supplementary information component based at least in part on the determination satisfying a threshold value (e.g., a number of interactions with the category or attribute by other users, whether the items added to the interest queue exceed a threshold associated with a program, etc.).

At 1112, the process 1000 may generate a supplementary information component. For example, the search engine computers 910 may provide the supplementary information component for display. The display may comprise various locations around the user interface, including a display adjacent to the first portion of the user interface. In some examples, the supplementary information component may be provided within a proximity of the item of the one or more search results. In some examples, the search engine computers 910 may update the user interface to provide the supplementary information component for display in a second portion of the user interface.

Once provided, the user device may interact with the supplementary information component. For example, the search engine computers 910 can receive an indication of a selection of the supplementary information component and provide one or more supplementary search results associated with the attribute and/or category (e.g., in response to the selection to add the item to an interest queue, in response to a selection to access an item detail document associated with an item in the supplementary search results, etc.).

Figure 12:
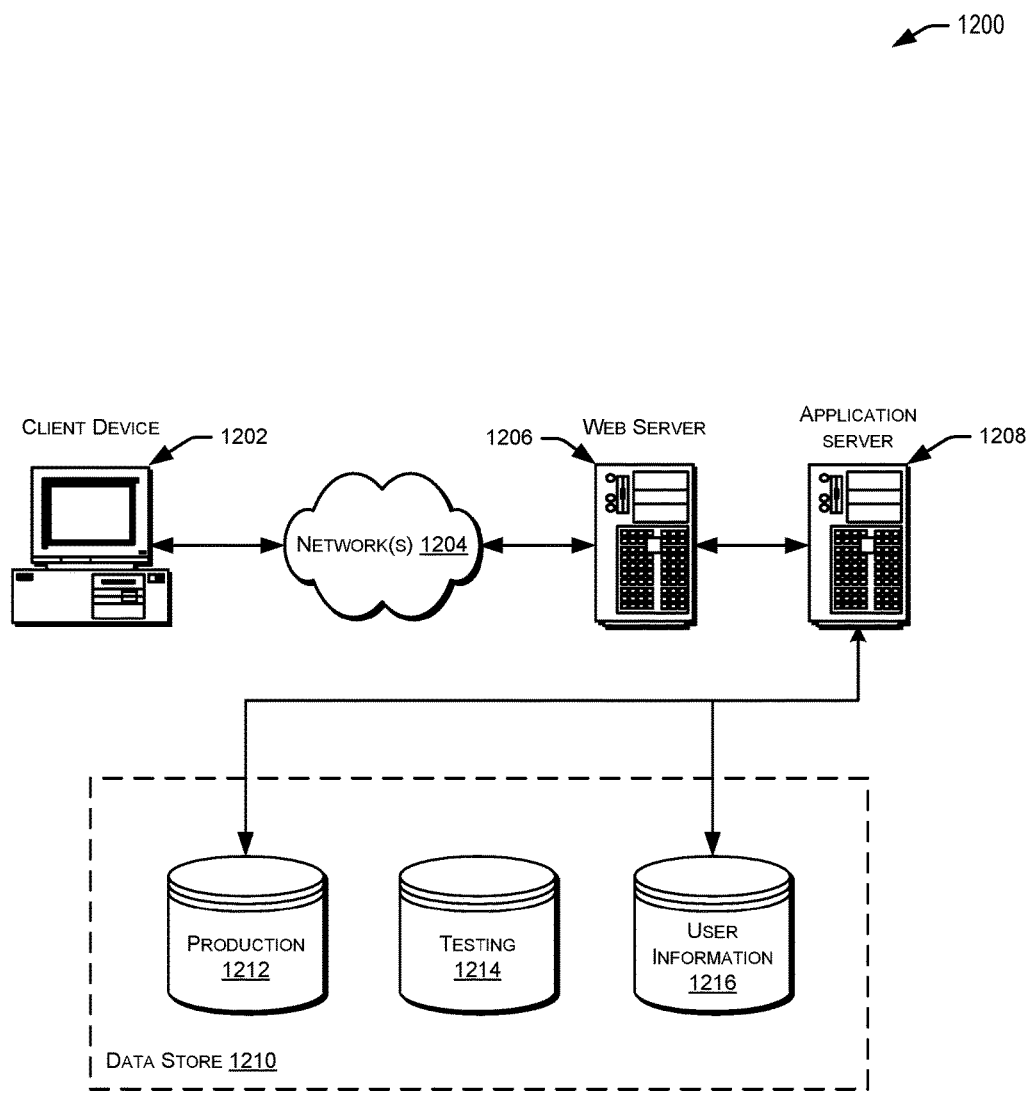
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a server computer from a user device, a search query, the search query being received from the user device via a graphical user interface (GUI);
providing, by the server computer, one or more search results comprising at least a content item, the search results being provided to the GUI;
absent a second search query for an item, identifying a selection of a portion of a first graphical user interface object at the GUI;
identifying that the content item has been placed in an interest queue based at least in part on the selection of the portion of the first graphical user interface object at the GUI;
determining an attribute associated with the content item that is placed in the interest queue;
determining a category of the content item that was placed in the interest queue, the category being determined based at least in part on the attribute, and the category being a child of a parent category in a hierarchy;
providing a supplementary information component based at least in part on determining that a number of user interactions by other users with other items associated with the attribute or category of the content item satisfies a threshold value, the supplementary information component comprising one or more additional content items associated with the attribute or the category, the one or more additional content items being associated with a same parent category as the parent category of the content item in the interest queue, the supplementary information component being a second graphical user interface object that illustrates the one or more additional content items within the second graphical user interface object at the GUI; and
updating the GUI to include the supplementary information component, the supplementary information component provided with the content item of the one or more search results.

2. The computer-implemented method of claim 1, wherein the interest queue identifies one or more items of interest.

3. A non-transitory computer-readable medium including instructions that, when executed by a processor of a computing device, cause the computing device to:
provide, for presentation in a first portion of a graphical user interface (GUI), one or more search results comprising an item;
identifying a selection of the first portion of the GUI;
identify that the item was placed in an interest queue based at least in part on the selection of the first portion of the GUI;
determine an attribute associated with the item that was placed in the interest queue;
determining a category of the item that was placed in the interest queue, the category being a child of a parent category in a hierarchy;
absent a second search query, generate a supplementary information component that comprises one or more additional items associated with the attribute or category of the item that was placed in the interest queue, the one or more additional items being associated with a same parent category as the parent category of the item in the interest queue, wherein the supplementary information component is a graphical user interface object that illustrates the one or more additional items within the graphical user interface object at the GUI; and
update the GUI to include the supplementary information component for presentation adjacent to the first portion of the GUI.

4. The non-transitory computer-readable medium of claim 3, wherein determining the attribute comprises identifying a selection of the attribute from a list of a plurality of attributes.

5. The non-transitory computer-readable medium of claim 3, wherein a link to the interest queue is provided for display on the GUI that displays the one or more search results.

6. The non-transitory computer-readable medium of claim 3, wherein the interest queue comprises an electronic shopping cart associated with an electronic marketplace that offers the item, and wherein the computing device is further caused to provide a cart user interface configured to present the electronic shopping cart.

7. The non-transitory computer-readable medium of claim 6, wherein the computing device is further caused to:
receive a request to return to the one or more search results of the GUI from the cart user interface; and
in response to the request to return to the one or more search results, provide the supplementary information component in the GUI, wherein the supplementary information component is provided independent of receiving a search query associated with the one or more additional items associated with the attribute.

8. The non-transitory computer-readable medium of claim 3, wherein the GUI comprises an additional user interface object that is configured to present a number of items placed in the interest queue based at least in part on the item being placed in the interest queue.

9. The non-transitory computer-readable medium of claim 3, wherein the computing device is further caused to:
receive an indication of a selection of the supplementary information component; and
provide one or more supplementary search results associated with the category.

10. The non-transitory computer-readable medium of claim 3, wherein generating the supplementary information component is based at least in part on a probability of a user interacting with the one or more additional items.

11. A system, comprising:
a memory that stores computer-executable instructions; and
a processor device configured to access the memory, the processor device configured to execute the computer-executable instructions to at least:
receive a search query from a graphical user interface (GUI);
provide, for presentation within a first portion of the GUI, one or more search results comprising at least information configured to represent an item;
absent a second search query, receive a request to place the item in a virtual shopping cart through a selection of a portion of a first graphical user interface object at the GUI;
identify that the item has been placed in the virtual shopping cart based at least in part on the selection of the portion of the first graphical user interface object at the GUI;

absent the second search query, generate a supplementary information widget based at least in part on the request to place the item in the virtual shopping cart, the item being associated with a category that is a child of a parent category in a hierarchy, the supplementary information widget comprising at least one item that is associated with a same parent category as the parent category of the item in the virtual shopping cart; and update the GUI to provide the supplementary information widget for display in a second portion of the GUI, the supplementary information widget provided for display adjacent to the information configured to represent the item within the one or more search results.

12. The system of claim 11, wherein the memory stores further instructions that, when executed by the processor device, causes the processor device to update a third portion of the GUI to identify that the item was added to the virtual shopping cart.

13. The system of claim 12, wherein the supplementary information widget is generated further based at least in part on a user request to return to the one or more search results after presenting a cart user interface that represents the virtual shopping cart.

14. The system of claim 11, wherein the supplementary information widget comprises one or more additional content items associated with an attribute and the category of an item, and wherein the attribute of the item comprises a physical characteristic of the item.

15. The system of claim 14, wherein the physical characteristic of the item comprises a size of the item or a color of the item.

16. The system of claim 11, wherein the GUI comprises an offer associated with the item from the one or more search results.

17. The system of claim 11, wherein the GUI comprises a quantity incrementor associated with the item.

18. The system of claim 11, wherein the search query is received from a user and the supplementary information widget comprises an additional item, the additional item being identified based at least in part on identifying an additional category associated with an item that was historically identified as being of interest to the user during a current session or a previous session, the additional item being identified based at least in part on being associated with the additional category.

19. The system of claim 11, wherein the search query is received from a user and the supplementary information widget comprises an additional item, the additional item being identified based at least in part on the additional item being associated with another category that is related to the category of the item placed in the virtual shopping cart.

20. The system of claim 11, wherein the search query is received from a user and the supplementary information widget comprises an additional item, the additional item being identified from other items that were placed in respective virtual shopping carts of other users after the item was placed in the respective virtual shopping carts of the other users.

* * * * *